Figure 1:
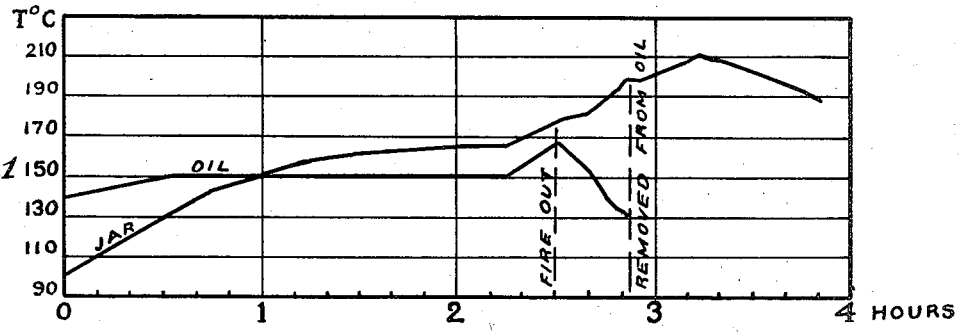

Oct. 15, 1935.   I. I. OSTROMISLENSKY   2,017,671

METHOD OF PRODUCING CHEMICALLY PURE 4,4'-DI-(1-PHENYL-3-METHYL-PYRAZOLONYL)

Filed March 28, 1934

IWAN I. OSTROMISLENSKY

INVENTOR

BY John P. Nikonov

ATTORNEY

Patented Oct. 15, 1935

2,017,671

UNITED STATES PATENT OFFICE 2,017,671

METHOD OF PRODUCING CHEMICALLY PURE 4,4'-DI-(1-PHENYL-3-METHYL-PYRAZOLONYL)

Iwan I. Ostromislensky, New York, N. Y., assignor, by mesne assignments, to Medico Chemical Corporation of America, New York, N. Y.

Application March 28, 1934, Serial No. 717,723

6 Claims. (Cl. 260—45)

My invention relates to the methods of producing 4,4'-di-(1-phenyl-3-methyl-pyrazolonyl) in a chemically pure state and of relatively low toxicity.

I have found that 4,4'-di-(1-phenyl-3-methyl-pyrazolonyl), hereinafter called dipyrazolonyl, when administered in sufficient doses, considerably alleviates symptoms of the anaphylactic shock in animals and thus prevents their otherwise inevitable death. Further investigations have shown, in addition, that in accordance with my theory published as yet only in Russian ("Idiosinkrasia i Morfinomania", New York, 1932), this substance considerably relieves withdrawal symptoms in morphine addicts, and checks entirely and reliably the most severe of these symptoms. Likewise in accordance with the above theory, dipyrazolonyl has been found to be a very valuable analgesic (for instance, in neuritis, lumbago, headache, toothache etc.), and, in addition, a specific for a number of allergic diseases, in particular arthritis, asthma, hay fever, and migraine. Clinical study of dipyrazolonyl in various hospitals in the United States has shown, however, that the therapeutic dose of this preparation must range around 0.05 gram per every pound of the patient's weight, and that in cases of withdrawal of morphine from morphine addicts, and in the treatment of hay fever, allergic arthritis, etc., dipyrazolonyl must be administered in the dosage indicated above over a period of from four to eight days. It is clear therefore why it is important in all these cases to use only the chemically pure preparation which is of relatively low toxicity as experimentation has shown.

The production of pyrazolones in chemically pure state is a very difficult problem. For even the simplest pyrazolones and their analogues, which are produced, for instance, by the condensation of arylhydrazins with alkylacidylacetates, react, as it is known, in three tautomeric forms, namely:

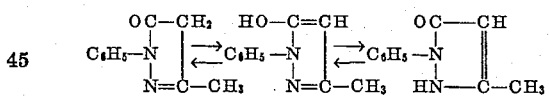

Even more complex is the reaction occurring during the formation of dipyrazolonyls. In particular, the so-called bis-1-phenyl-3-methyl-5-pyrazolone, described by Knorr back in 1883 but never used as a specific therapeutic preparation, is produced by heating 1-phenyl-3-methyl-5-pyrazolone with various oxidizing agents, and in particular with phenylhydrazin, or by direct heating of a mixture of ethylacetoacetate with phenylhydrazin:

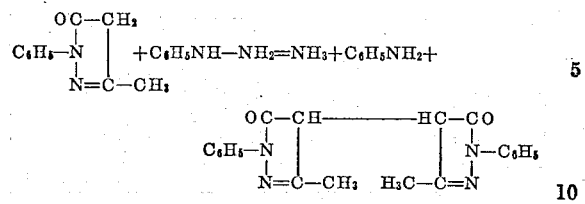

As outlined under the conditions described in the literature, this substance is a complex mixture of various compounds, and possesses relatively high toxicity. On being subcutaneously injected, it is tolerated by rabbits and guinea pigs only in doses of 0.3 gram per kilogram of their weight; 0.4 gram of the preparation causes the death of the animals, usually from one to four hours after the injection.

My invention is more fully described in the accompanying specification and drawing in which—

Figure 2:
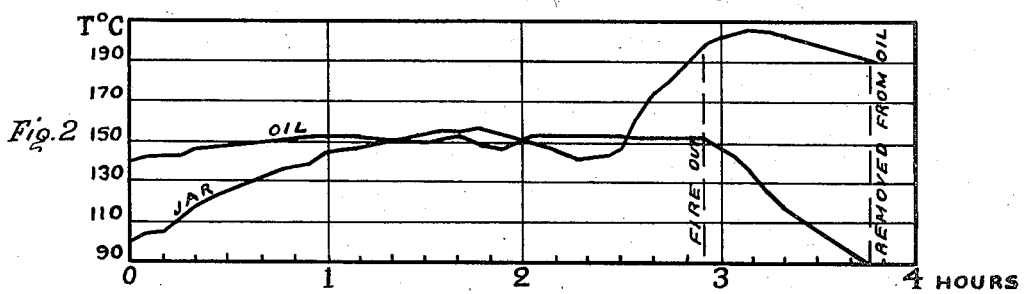
Figure 3:
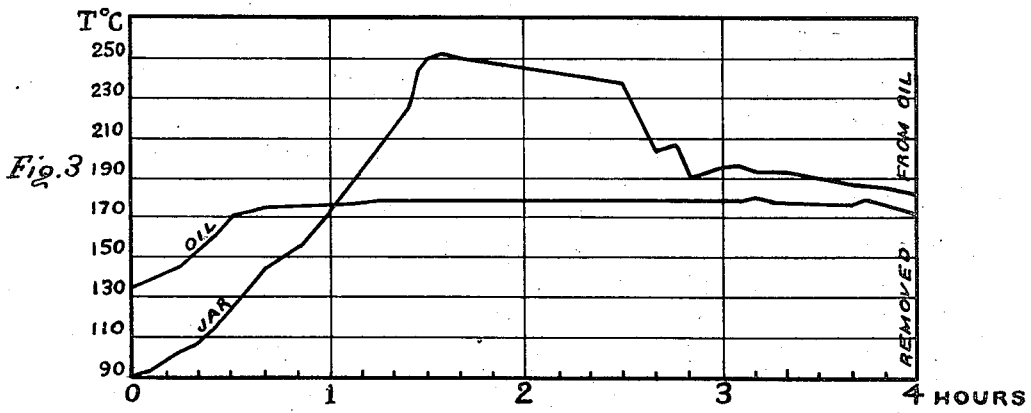
Figure 4:
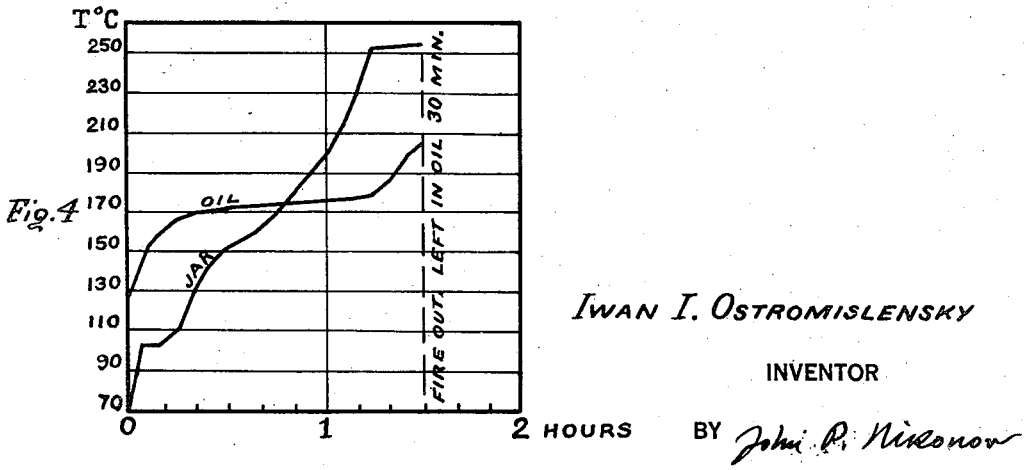

Fig. 1 is a curve indicating temperature conditions of the reaction mixture resulting in the production of a pure product, Fig. 2 is a similar curve showing conditions when an impure product is obtained, Fig. 3 shows conditions when a pure product is obtained, and Fig. 4 is a curve showing conditions when an impure product is obtained.

For the safe of brevity, this substance will be hereinafter called "Dipyrazolonyl", while the chemically pure substance of low toxicity will be called "Rossium."

In studying the condensation of ethylacetoacetate with phenylhydrazin, according to the equation:

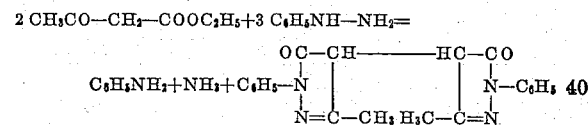

I have succeeded in finding conditions under which Rossium of sufficient purity, and therefore of relatively low toxicity, is produced. First, I have found that this reaction belongs to the class of exothermic reactions, in which a large amount of heat is produced, as it may be seen from the accompanying diagrams. In accordance with this observation, experiments have shown that the duration of heating of the reagent mixture and, especially, the temperature of the latter are the decisive factors insofar as the purity of the final product is concerned. The temperature of the mixture, according to my observations, must not rise above 255° C. or fall below 210° C. If these conditions are not present, the produced dipyrazolonyl contains various other substances, which are not removed even by the most careful washing with ethyl alcohol and ether in accordance with Knorr's instructions. At a temperature higher than 255° C. pyrazolon begins to darken and decompose. In addition, anilin which forms during the reaction, also partly unchanged phenylhydrazin, give rise to various quinones and tar products. The reagent mixture is partly carbonized, and the byproducts of the reaction cannot be completely removed by any method known in the literature.

Experimentation has shown in addition that the mere precipitation of aqueous solutions of metallic salts of pyrazolone by means of acids is likewise inadequate for the purpose.

At a temperature of the reaction mixture below 210° C., as well as when the heating is not of sufficiently long duration, the reaction is not completed. 1-phenyl-3-methyl-5-pyrazolon and the corresponding dipyrazolonyl, formed as intermediate products, partly remain unchanged, and partly are condensed with anilin and even with phenylhydrazin. The dipyrazolonyl which is obtained under these conditions as the chief product contains a large amount of various toxic substances or admixtures which cannot be removed entirely by any methods known and described in the literature. This product is of relatively high toxicity.

It should be noted that in order to attain the necessary temperature (210°–255° C.) it is not necessary to heat the reaction mixture above 170° C. or even 140°–150° C., as the amount of heat necessary for the completion of the reaction is produced by the reaction itself. Heating to 100° C. (water bath) is not sufficient, however, as in this case phenylmethylpyrazolone, which is the primary product of the reaction, is by far not completely oxidized by phenylhydrazin.

It is understood, of course, that the reagent mixture must be kept at the necessary level of temperature (210°–255° C.) for a length of time sufficient for the reaction, i. e., not less than two hours.

The conditions which I established for heating of the reaction mixture are essential for producing this substance (Rossium) of sufficient purity to be of practical value as a therapeutic specific.

The proportion of reagent ingredients of the reaction affects chiefly the yield of Rossium. Phenylhydrazin must, of course, be used in a quantity somewhat exceeding the theory. Thus, a mixture of one part of ethylacetoacetate by weight with 1.4 parts of phenylhydrazin (theory requires 1.246 parts), subjected to the conditions of treatment as described above, yields about one part of sufficiently pure Rossium. It is understood, of course, that upon completion of the reaction the remainder of the ingredients not used up in the reaction must be removed by a suitable organic solvent, as well as the products of oxidation and decomposition of phenylhydrazine, and the still remaining small quantity of anilin.

*Example I.*—One kilogram of ethylacetoacetate is mixed in an open cylindrical glass vessel with 1.4 kilograms of phenylhydrazin (the theory requires 1246 grams). The mixing produces some heat, so that the temperature of the mixture rises within a few minutes to 70°–150° C., and the heating of the oil bath continues for 2 hours 30 minutes at the same temperature. 20 minutes after the heating of the oil bath has ceased, the resulting mixture is removed from the oil bath. In spite of the fact that at this time the temperature of the oil has fallen to approximately 135° C., the temperature of the reagent mixture continues to increase rapidly (see temperature diagram in Fig. 1). Approximately a half hour after the removal of the mixture from the bath, or 3 hours 20 minutes after the beginning of the process, the temperature of the mixture rises to a maximum of 212° C., and then drops slowly. 36 minutes after reaching the maximum, the temperature of the mixture drops to 190° C.

After having been washed with alcohol and dried to a constant weight, for instance, at 100° C., the product of the reaction, Rossium, is of relatively low toxicity: of six guinea pigs which received 0.6 gram of the preparation per kilogram of their weight, only one died; all of five guinea pigs that received 0.5 gram of the preparation survived. The yield of the chemically pure substance under this process fluctuates around one kilogram.

*Example II.*—A mixture of one kilogram of ethylacetoacetate with 1.4 kilograms of phenylhydrazin is heated on an oil bath, the temperature of the reaction mixture being regulated as shown on the diagram of Fig. 3. The maximum temperature of the mixture reaches in this case 252° C., while the temperature of the oil bath is kept at about 178° C.

The biological constants of the Rossium obtained by this method were found to be identical with the constants of the preparation obtained according to the Example I.

The temperature graphs in diagrams Figs. 2 and 4 give a clear idea of the methods which inevitably result in impure and therefore highly toxic pyrazolonyl. In the first case (Fig. 2) the maximum temperature of the mixture, 205° C., was too low, in the second case this maximum was correct (253° C.) but the duration of the heating of the mixture was insufficient: after reaching 150° C. it was heated for only one hour. Both these factors, i. e., insufficient duration of heating, and a too low temperature of the mixture, lead to the formation of various toxic substances.

The latter cannot be fully removed from the raw product of the reaction, dipyrazolonyl, by any usual methods of purification, and in particular by the action of boiling alcohol, acetone and ether, etc. Similarly, repeated precipitation of alkaline solutions of the substance, i. e., aqueous solutions of its sodium salts, by means of acids, for instance, hydrochloric acid, does not lead to the desired result.

The biological testing of the first preparation (see temperature curves in Fig. 2) gave the following results: of five guinea pigs that received 0.4 gram of dipyrazolonyl per kilogram of their weight, not a single one survived. Three of the animals died in a few hours, two in less than one hour, after the injection of the preparation.

The biological testing of the second preparation (curve Fig. 4) gave the following results: of 5 guinea pigs that received 0.5 gram of dipyrazolonyl per kilogram of their weight only one survived, but it perished three days after the injection of the preparation.

The duration of the heating of the original mixture necessary to obtain chemically pure Rossium is partly determined by the material of the vessel in which the heating takes place, and the thickness of the walls of the vessel, or rather by the heat conductivity of the material, and partly by the quantity of the mixture. For in this process the heat is not only introduced from without by the person performing the experiment, but is also produced by the reaction itself. For the same reason, and because of the exothermic character of the reaction process, it is necessary to watch the temperature of the reaction mixture itself.

I have established, however, that in order that chemically pure Rossium may be obtained, the temperature of the reaction mixture must reach, at least for a short time, 210° C., but must not exceed 255° C., and that the heating of the reaction mixture to 150° C. and above must last not less than two hours.

Deviation from these conditions of the reaction inevitably leads to the formation of an impure and, therefore, toxic substance which cannot be used in the treatment of the diseases mentioned above. The usual methods of purification described in the literature do not lead to the desired results.

In contradistinction to the preparation obtained by Knorr's method, Rossium is almost one half as toxic, and is more resistant to the action of light. Thus, in the open air under prolonged action of sunlight or on being dried (at 100° C.), it does not lose its snow-white color. The preparation obtained by Knorr's method darkens quickly on the surface when pressed on Buechner's funnels or being dried. This dark color assumes with time a clearly bluish tint. As I have found, it belongs to Pyrazolone blue which forms on the surface of the substance under the influence of light and air. Apparently certain admixtures in dipyrazolonyl obtained by Knorr's method accelerate the formation of Pyrazolone blue.

I claim as my invention:

1. A step in the process of producing 4,4'-di-(1-phenyl-3-methyl-pyrazolonyl) in a pure state and of a comparatively low toxicity, consisting in heating a mixture of ethylacetoacetate with phenylhydrazine, and regulating the temperature of the reaction mixture so that it shall reach 210° C. but will not exceed 255° C.

2. A step in the process of producing 4,4-di-(1-phenyl-3-methyl-pyrazolonyl) in a pure state and of a comparatively low toxicity, consisting in heating a mixture of ethylacetoacetate with phenylhydrazine, regulating the temperature of the reaction mixture so that it will reach 210° C. but will not exceed 255° C., and continuing the heating for at least two hours after the temperature of the reaction mixture has reached 150° C.

3. A step in the process of producing 4,4'-di-(1-phenyl-3-methyl-pyrazolonyl) in a pure state and of a comparatively low toxicity, consisting in heating a mixture of ethylacetoacetate with phenylhydrazine partly by an external heating medium and partly by the exothermic heat of the reaction, and regulating the temperature of the reaction mixture so that it shall reach 210° C. but will not exceed 255° C.

4. A step in the process of producing 4,4'-di-(1-phenyl-3-methyl-pyrazolonyl) in a pure state and of comparatively low toxicity, consisting in heating a mixture of ethylacetoacetate with phenylhydrazine partly by an external heating medium, partly using the exothermic heat of the reaction, regulating the temperature of said heating medium so as to maintain the temperature of the reaction mixture between 210° C. and 255° C., and removing from the product the remaining anilin, products of oxidation and decomposition of phenylhydrazine, and the remainder of the ingredients not used in the reaction, by an organic solvent capable of dissolving said remaining substances.

5. A method of producing 4,4'-di-(1-phenyl-3-methyl-pyrazolonyl) in a pure state and of comparatively low toxicity, consisting in heating a mixture of ethylacetoacetate with phenylhydrazine partly by an external heating medium, partly using the exothermic heat of the reaction, continuing the heating for at least two hours after the temperature of the reaction mixture has reached 150° C., regulating the temperature of said heating medium so as to maintain the temperature of the reaction mixture between 210° C. and 255° C., and removing from the product the remaining anilin, products of oxidation and decomposition of phenylhydrazine, and the remainder of the ingredients not used up in the reaction, by an organic solvent capable of dissolving said remaining substances.

6. A method of producing 4,4-di-1-phenyl-3-methyl-pyrazolonyl) in a pure state and of comparatively low toxicity, consisting in heating a mixture of ethylacetoacetate with phenylhydrazine partly by an external heating medium, partly using the exothermic heat of the reaction, regulating the temperature of said reaction mixture between 210° C. and 255° C., continuing the heating for at least two hours after the temperature of the reaction mixture has reached 150° C., and removing impurities from the product by washing it with organic solvents.

IWAN I. OSTROMISLENSKY.